United States Patent
Kurmlavage

(10) Patent No.: US 10,136,758 B1
(45) Date of Patent: Nov. 27, 2018

(54) FOOD PAN COVER WITH INDICIA HOLDER AND SELF-CLOSING HINGES

(71) Applicant: Spirit Specialty Solutions, Inc., Broomall, PA (US)

(72) Inventor: Michael M Kurmlavage, Monroeville, NJ (US)

(73) Assignee: Spirit Specialty Solutions, Inc., Broomall, PA (US)

( * ) Notice: Subject to any disclaimer, the term of this patent is extended or adjusted under 35 U.S.C. 154(b) by 0 days.

(21) Appl. No.: 15/823,065

(22) Filed: Nov. 27, 2017

(51) Int. Cl.
| | |
|---|---|
| *B65D 43/16* | (2006.01) |
| *A47J 36/12* | (2006.01) |
| *A47J 47/10* | (2006.01) |
| *B65D 43/24* | (2006.01) |
| *G09F 3/02* | (2006.01) |

(52) U.S. Cl.
CPC ............... *A47J 36/12* (2013.01); *A47J 47/10* (2013.01); *B65D 43/169* (2013.01); *B65D 2203/02* (2013.01); *B65D 2251/1008* (2013.01); *G09F 2003/0208* (2013.01); *G09F 2003/0272* (2013.01)

(58) Field of Classification Search
CPC .............. B65D 43/169; B65D 2203/02; B65D 2251/1008; A47J 36/12; A47J 47/10; G09F 2003/0208; G09F 2003/0272
USPC ....... 220/840, 831, 834, 259.1, 254.3, 254.5
See application file for complete search history.

(56) References Cited

U.S. PATENT DOCUMENTS

| | | | | |
|---|---|---|---|---|
| 4,759,478 A | * | 7/1988 | Richardson | B65D 43/161 206/508 |
| 4,942,271 A | * | 7/1990 | Corsi | H02G 3/0418 138/162 |
| 5,048,715 A | * | 9/1991 | Wolff | B65D 43/168 16/267 |
| 5,145,088 A | | 8/1992 | Goujon | |
| 5,156,291 A | * | 10/1992 | Mielke | A01K 97/20 220/254.5 |
| 5,699,912 A | * | 12/1997 | Ishikawa | A47K 10/421 206/494 |
| 6,000,550 A | * | 12/1999 | Simpson | E05D 7/1077 16/257 |
| 6,092,690 A | * | 7/2000 | Bitowft | B65D 43/24 206/494 |
| 6,273,288 B1 | | 4/2001 | Jarvis | |
| 6,938,768 B2 | * | 9/2005 | Ferretti | B65D 43/0212 116/307 |
| 7,614,519 B2 | * | 11/2009 | Krauth | B65D 43/169 220/262 |

(Continued)

*Primary Examiner* — J. Gregory Pickett
*Assistant Examiner* — Niki M Eloshway
(74) *Attorney, Agent, or Firm* — Christopher Feigenbutz

(57) ABSTRACT

Provided is a cover for a food container comprising a self-closing hinged lid and a first and second indicia insert. The cover comprises a cover plate, a lid, and a self-closing hinge. The cover plate secures the cover to a food container and further includes a flange for accepting a first advertising indicia. The hinged lid rests on top of the cover plate and includes a flange for accepting a second advertising indicia, a notch for accessing the container, and support ribs. The self-closing hinges secure the cover plate to the hinged lid and further include a pair of hinge stops that are angled towards the hinges to prevent the hinged lid from remaining in an open position without an external force holding the lid open.

6 Claims, 12 Drawing Sheets

(56) References Cited

U.S. PATENT DOCUMENTS

2004/0195238 A1* 10/2004 Brija ................... A47J 36/06
                                                    220/254.3
2012/0164283 A1*  6/2012 Kissner ............... B65D 43/169
                                                     426/112

* cited by examiner

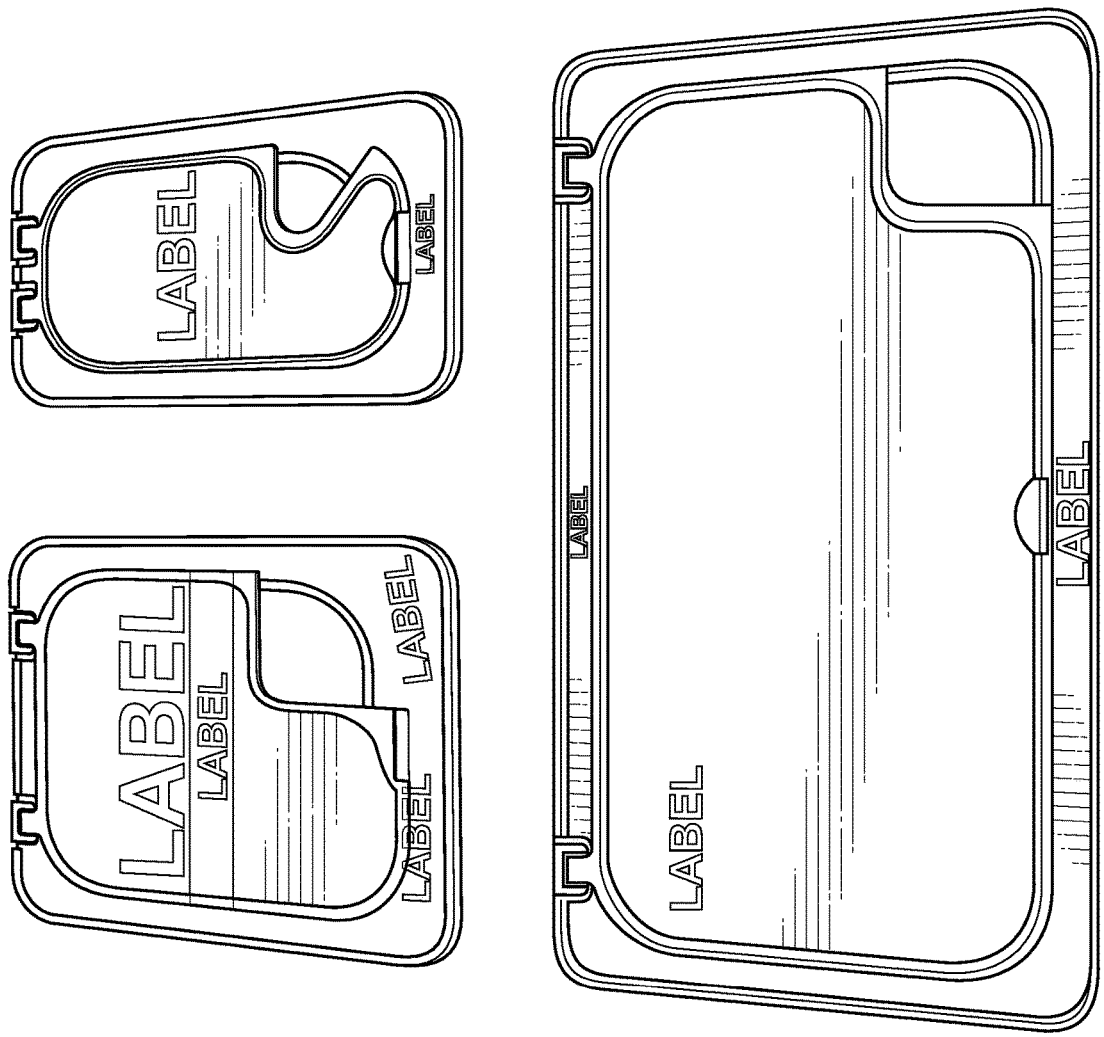

FOOD PAN COVER WITH INDICIA HOLDER AND SELF-CLOSING HINGES

BACKGROUND OF THE INVENTION

1. Field of the Invention

The present invention relates to food containers. More particularly, it pertains to a food container cover having advertising indicia and self-closing hinges.

Hotel pans are rectangular pans with an open top that are constructed of plastic, steel, or similar materials. These pans are used for cooking, serving, and/or storage of food items. Hotel pans are commonly found in the food service industry and are designed to fit in steam tables, racks, and chafers. Additionally, hotel pans are used to store items for restaurants that allow consumers to select hot or cold items in a cafeteria style format. With this manner of food service, items are stored with a glass divider between the customer and the items, and as the consumer selects an item to be added to his or her meal, the item is retrieved from the hotel pan.

The problem inherent with the cafeteria style format is that the hotel pans are typically stored without lids. As can be appreciated, storing hot and cold food items without lids increases the chances of contamination. Restaurant chains utilizing hotel pans in an open position have experienced multiple outbreaks of hepatitis, norovirus, *Campylobacter jejuni*, *E. Coli*, and *Salmonella* between 2008 and 2017 (see: https://en.wikipedia.org/wiki/Chipotle_Mexican_Grill).

To prevent the contamination issues inherent in storing food items in open hotel pans, some restaurants have begun utilizing lids that cover the open top of the pans. The difficulty with conventional lids that are currently used in the art is the lack of access they provide to the contents of the pan, the difficulty food service workers and consumers have with viewing and identifying the contents of the pan, and the inability of the lids to remain secured to the top of the hotel pan.

As can be appreciated, restaurants and companies prefer storing food items without lids, since this configuration enables consumers to see the food they are ordering. This acts as a form of advertising, and covering the food product may make ordering less intuitive and less appealing, thereby diminishing sales. Additionally, food servers are expected to work quickly when serving customers, and being able to visually identify the items contained in the pans prevents the need for memorizing the location of items or guessing what is in each pan. When accessing a hotel pan that is covered with a lid, workers are required to remove the entire lid to access the contents thereof. Additional space is therefore required to store the lid while it is removed. Also, workers must be careful not to set the lid down in a non-sanitary location or to mix lids, which may cause cross-contamination. The constant removal and replacement of lids can be tedious, causing some workers to forego using lids entirely, thereby defeating their purpose. Finally, when lids are used, additional space must be provided for spoons, ladles, tongs, and the like, as they cannot be stored in the container while a conventional lid is in use.

2. Description of the Prior Art

Devices have been disclosed in the prior art that relate to food container and hotel pan lids. These include devices that have been patented and published in patent application publications. These devices generally relate to lids for food containers and hotel pans. The following is a list of devices deemed most relevant to the present disclosure, which are herein described for the purposes of highlighting and differentiating the unique aspects of the present invention, and further highlighting the drawbacks existing in the prior art.

U.S. Pat. No. 6,273,288 B1 (JARVIS) discloses a removable cover for a food pan that includes a primary and a hinged lid, a notch for holding a food serving implement and a hinge. A flange on the cover secures the cover to the pan. A hinge stop on the cover stops the hinged lid when opened. A notch in the hinged lid provides placement of a serving utensil therein. This device, however, does not disclose a means for accepting a first and second advertising indicia within the primary and hinged lids, or a self-closing lid.

US 2004/0195238 A1 (BRIJA) discloses a hinged lid for a food pan that includes a cover having a notch, and a hinge fitted within the cutout portion and pivotally attached to the cover body. The Brija device, however, does not disclose a flange for securing the lid to the container, an indicia holder, or a self-closing lid.

U.S. Pat. No. 5,145,088 A (GOUJON) discloses a plastic lid for a container comprising a peripheral flange adapted to snap onto a complementary rim of the mouth of a container, a primary and a hinged lid, and a gripping tab. Goujon, however, do not disclose a notch, an indicia holder, or a self-closing lid.

SUMMARY OF THE INVENTION

The present invention overcomes the problems inherent with using hotel pans in an open position by providing a lid that addresses the issues present with conventional lids. The device comprises a cover for a food container with a self-closing hinged lid and a first and second indicia insert. The cover comprises a cover plate, a lid, and a self-closing hinge. The cover plate secures the cover to a food container and further includes a flange for accepting a first advertising indicia. The hinged lid rests on top of the cover plate and includes a flange for accepting a second advertising indicia, a notch for storing a food serving implement within the container, and support ribs. The self-closing hinge attaches the cover plate and the hinged lid, and further includes a pair of hinge stops that are angled towards the hinges to prevent the hinged lid from remaining in an open position without an external force holding the cover open.

The present invention substantially diverges in design elements from the prior art and consequently it is clear that there is a need in the art for an improvement to existing food container covers. In this regard the instant invention substantially fulfills these needs.

OBJECTS OF THE INVENTION

In view of the foregoing disadvantages inherent in the known types of food container covers now present in the prior art, the present invention provides a new food container cover wherein the same can be utilized for providing convenience to the user for preventing contamination to food items, providing ease of access to the contents of the container, and providing a means of advertising on the cover of the container.

It is therefore an object of the present invention to provide a new and improved cover for a food container that has all of the advantages of the prior art and none of the disadvantages.

It is another object of the present invention to provide a cover for a food container comprising a self-closing hinged lid and a first and second indicia insert.

Another object of the present invention is to provide a cover for a food container comprising a cover plate that secures the present invention to a food container and further includes a flange for accepting a first advertising indicia.

Yet another object of the present invention is to provide a cover for a food container comprising a hinged lid that rests on top of the cover plate and includes a flange for accepting a second advertising indicia, a notch for accessing the container, and support ribs. Self-closing hinges secure the cover plate to the hinged lid and prevent the hinged lid from remaining in an open position without an external force holding the lid open.

The food container cover may be readily fabricated from materials that permit relative economy and are commensurate with durability. Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

Figure 8:
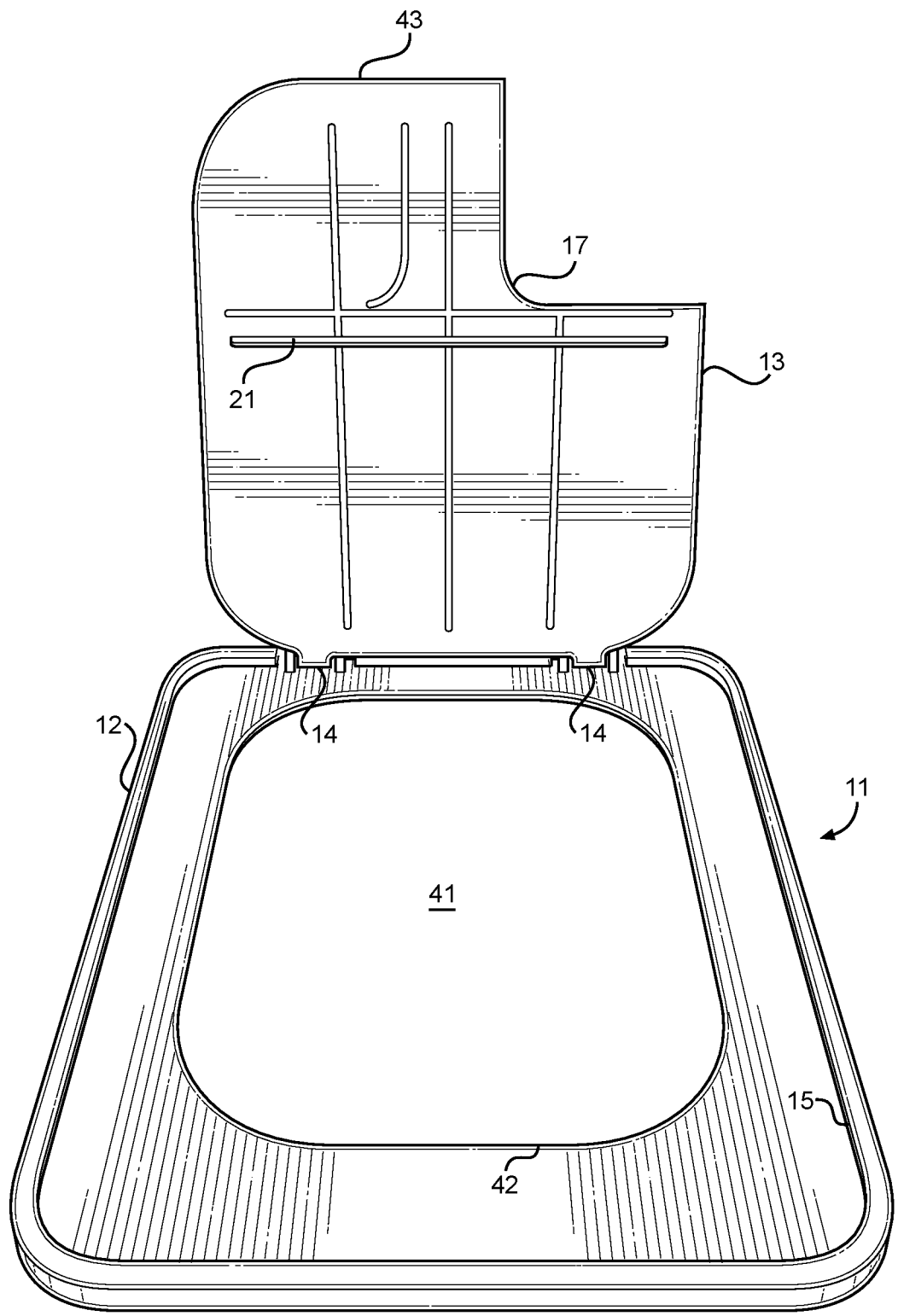

FIG. 8. shows a front view of the food container cover in an open position.

Figure 9:
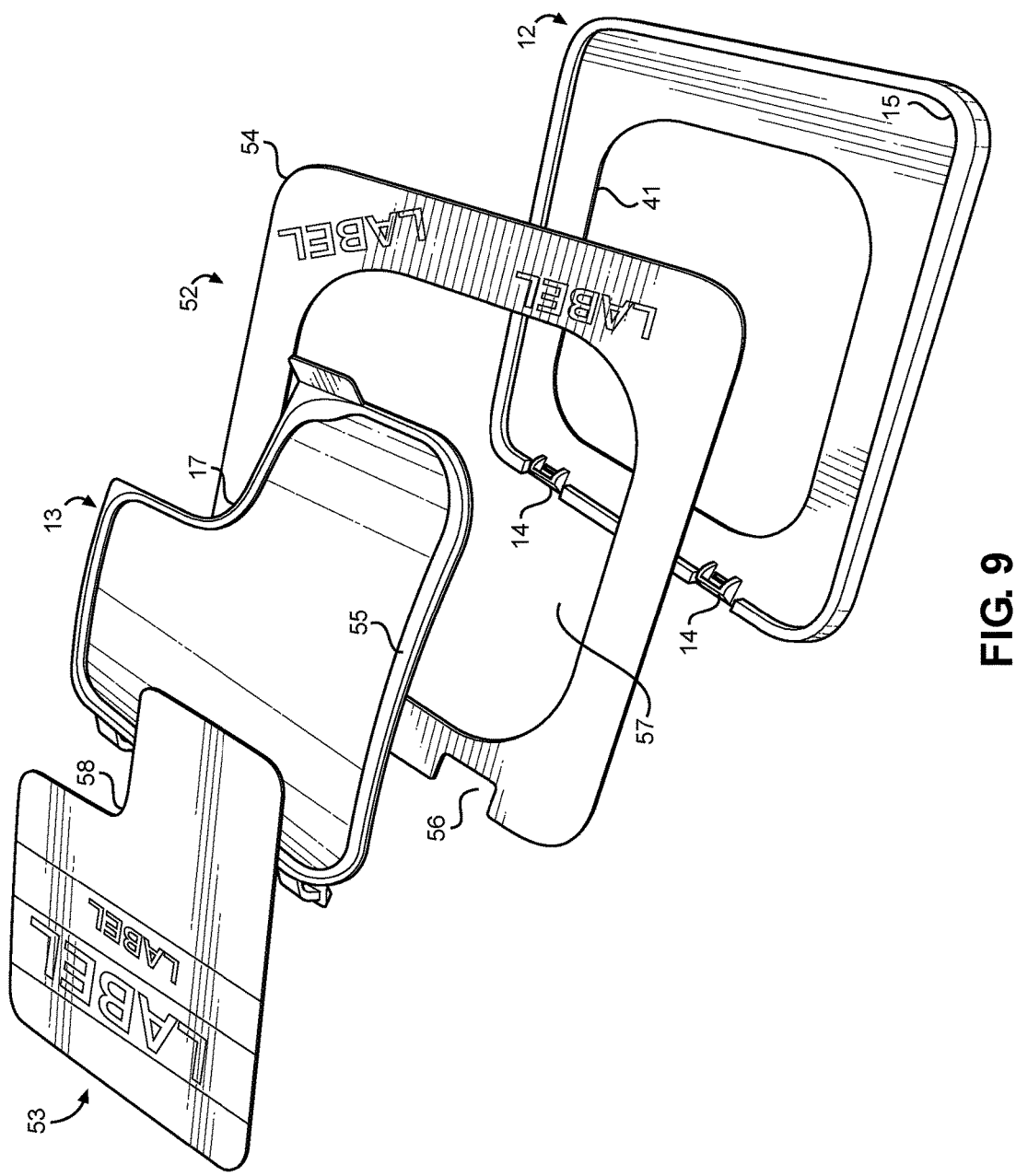

FIG. 9 shows an exploded view of the cover plate, hinged lid, and the first and second indicia inserts.

Figure 10:
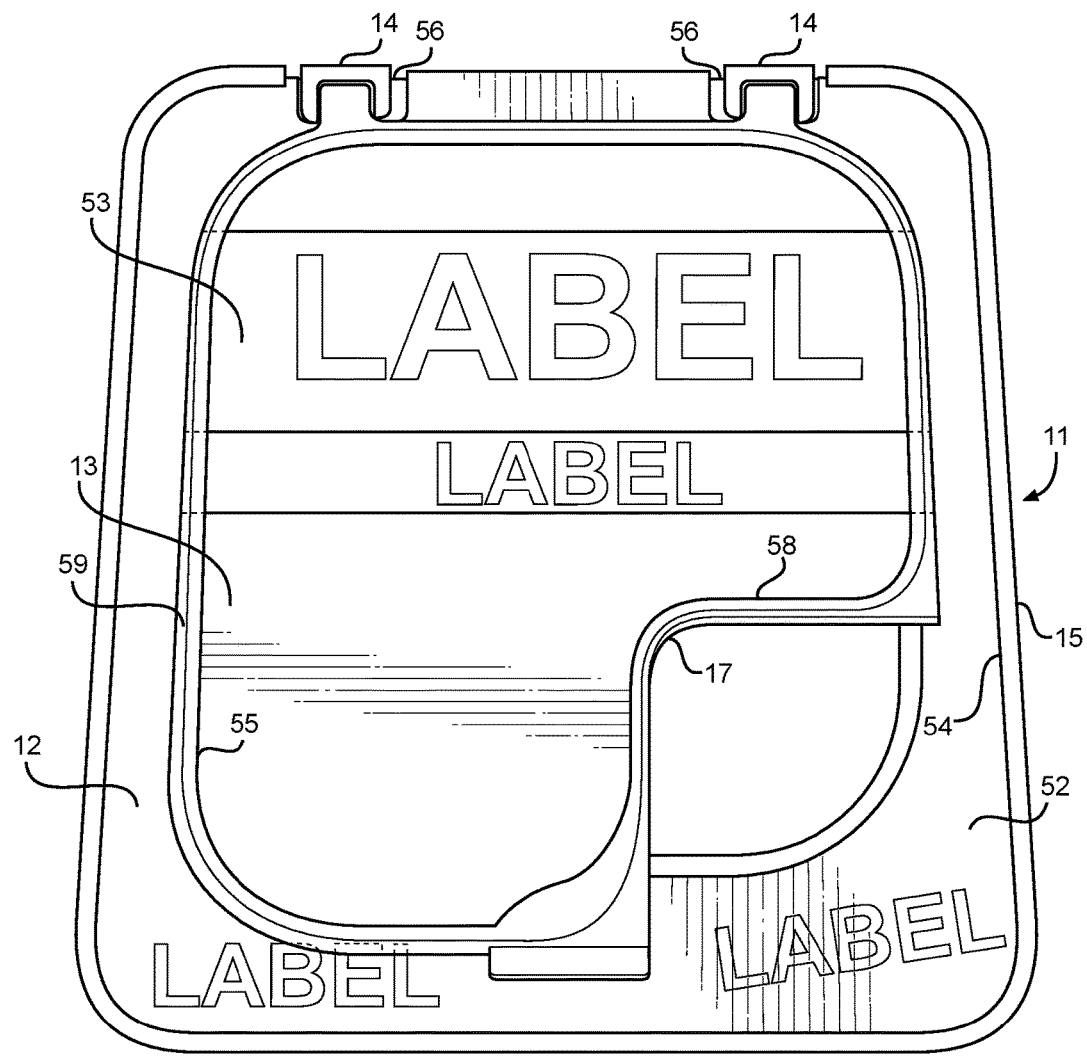

FIG. 10 shows an overhead view of the food container cover with first and second indicia inserts installed.

Figure 11:
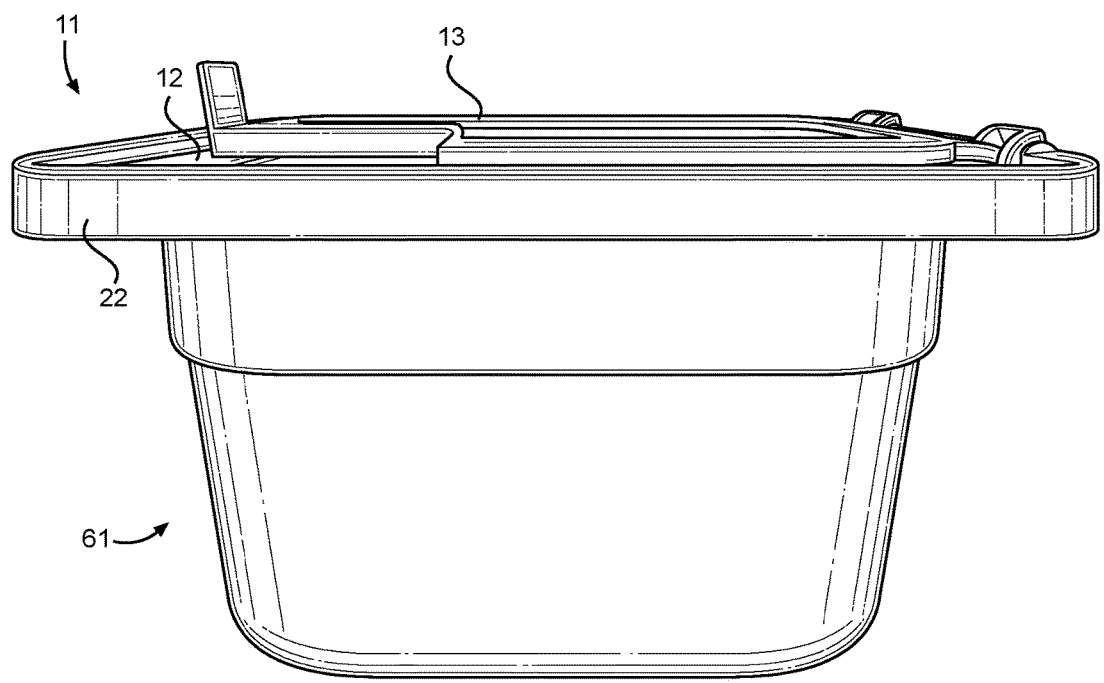

FIG. 11 shows a side view of the food container cover installed on a food container.

Figure 12:
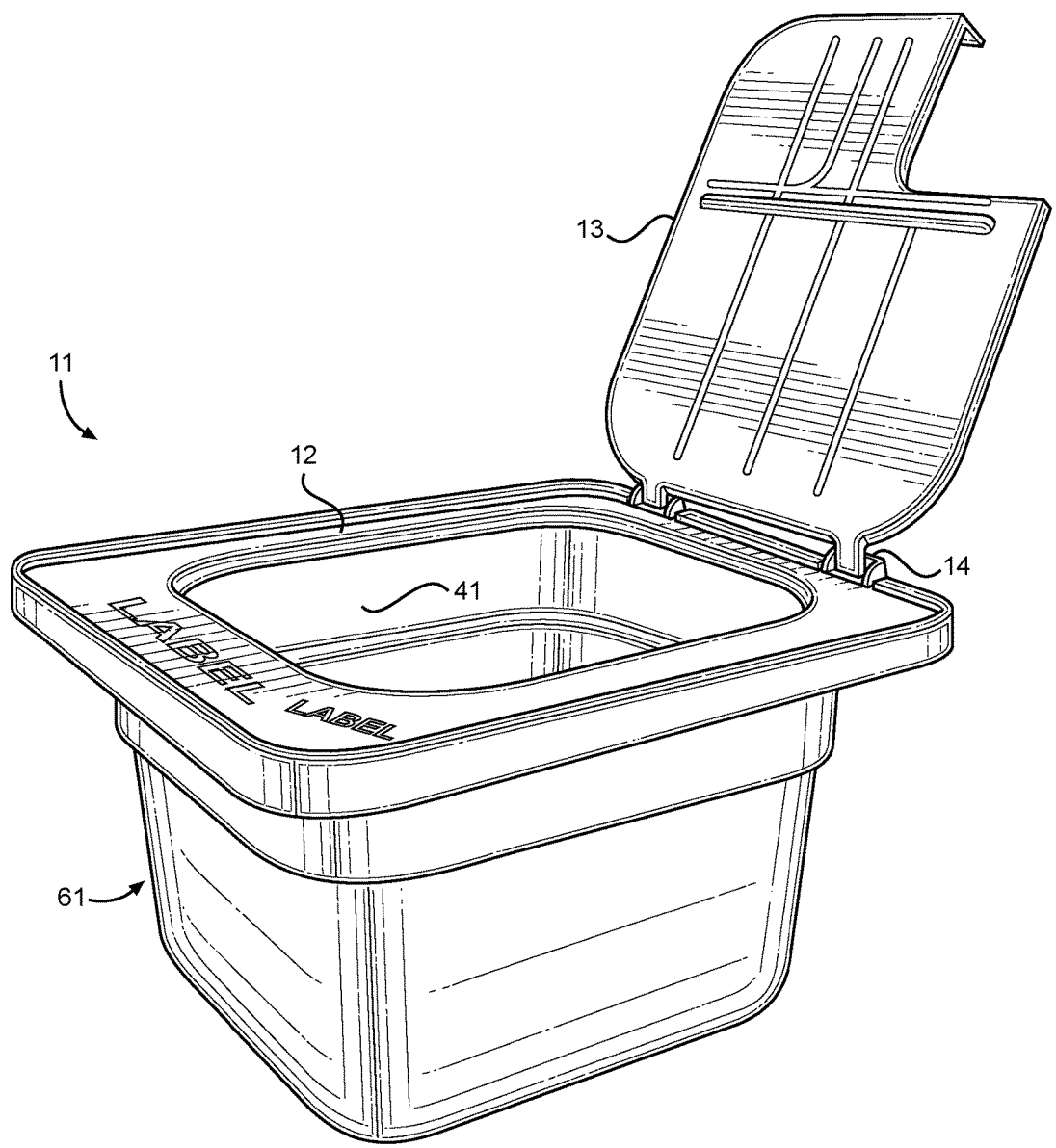

FIG. 12 shows a perspective view of the food container cover installed on a food container with the hinged lid in an open position.

FIG. 13 shows a view of a plurality of food container covers in different sizes.

DETAILED DESCRIPTION OF THE INVENTION

Reference is made herein to the attached drawings. Like reference numerals are used throughout the drawings to depict like or similar elements of the food container cover. For the purposes of presenting a brief and clear description of the present invention, the preferred embodiment will be discussed as used for covering a food container. The figures are intended for representative purposes only and should not be considered to be limiting in any respect.

Figure 1:
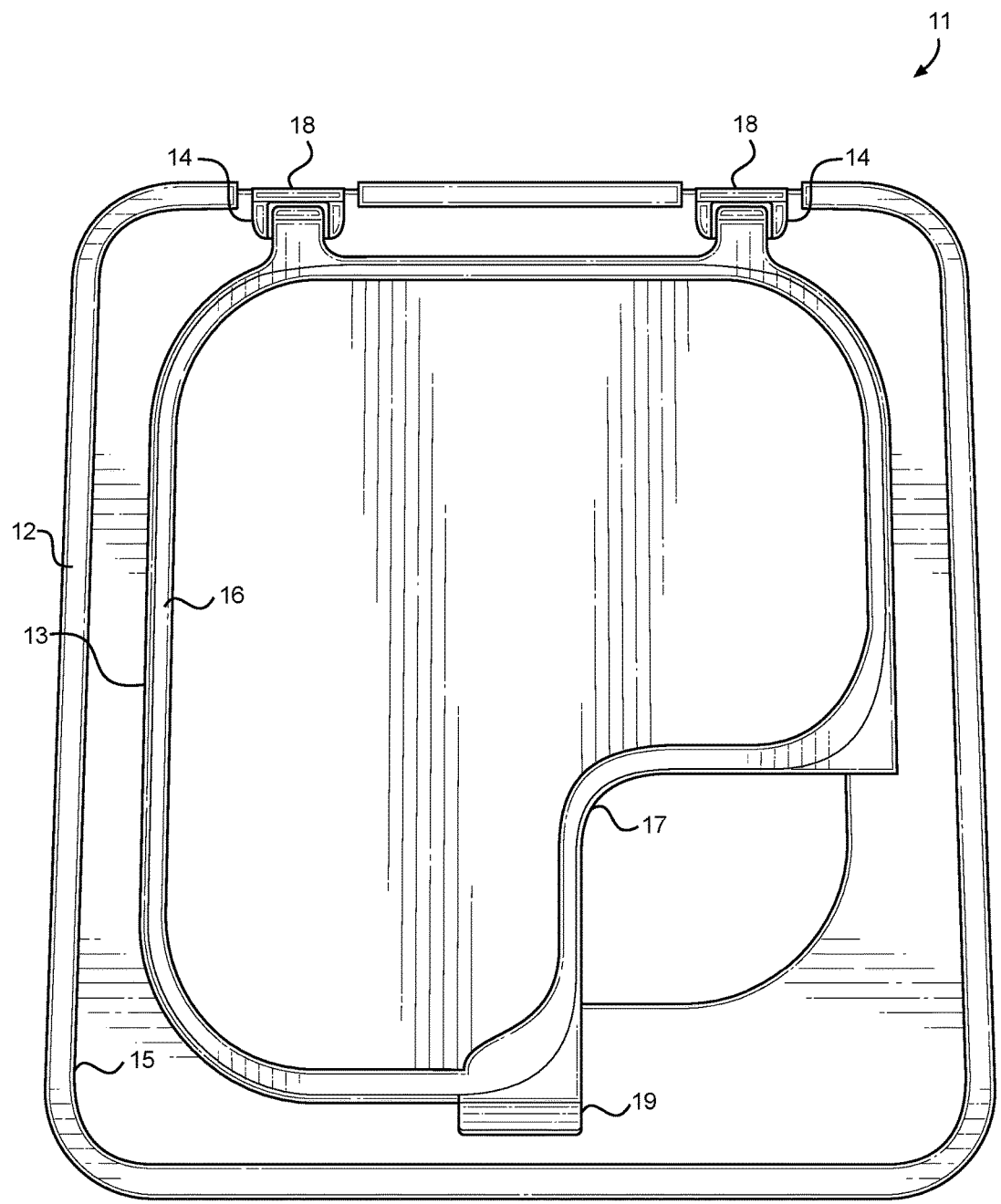
FIG. 1 shows an overhead view of the food container cover.

Referring now to FIG. 1, there is shown an overhead view of the food container cover 11. The device comprises a cover plate 12, a hinged lid 13, and a pair of self-closing hinges 14. The cover plate 12 secures the cover 11 to a food container and further includes an upper C-shaped flange 15 for accepting a first advertising indicia, which will be shown in greater detail below. The hinged lid 13 rests on top of the cover plate 12 and includes a flange 16 for accepting a second advertising indicia, which will be shown in greater detail below. The hinged lid 13 further includes a notch 17 or cutout for accessing the food container, and a tab 19 to facilitate opening. The self-closing hinges 14 secure the cover plate 12 to the hinged lid 13. The hinges 14 further include a pair of hinge stops 18 that are angled towards the hinges 14 to prevent the hinged lid 13 from remaining in an open position without an external force holding the cover open.

Figure 2:
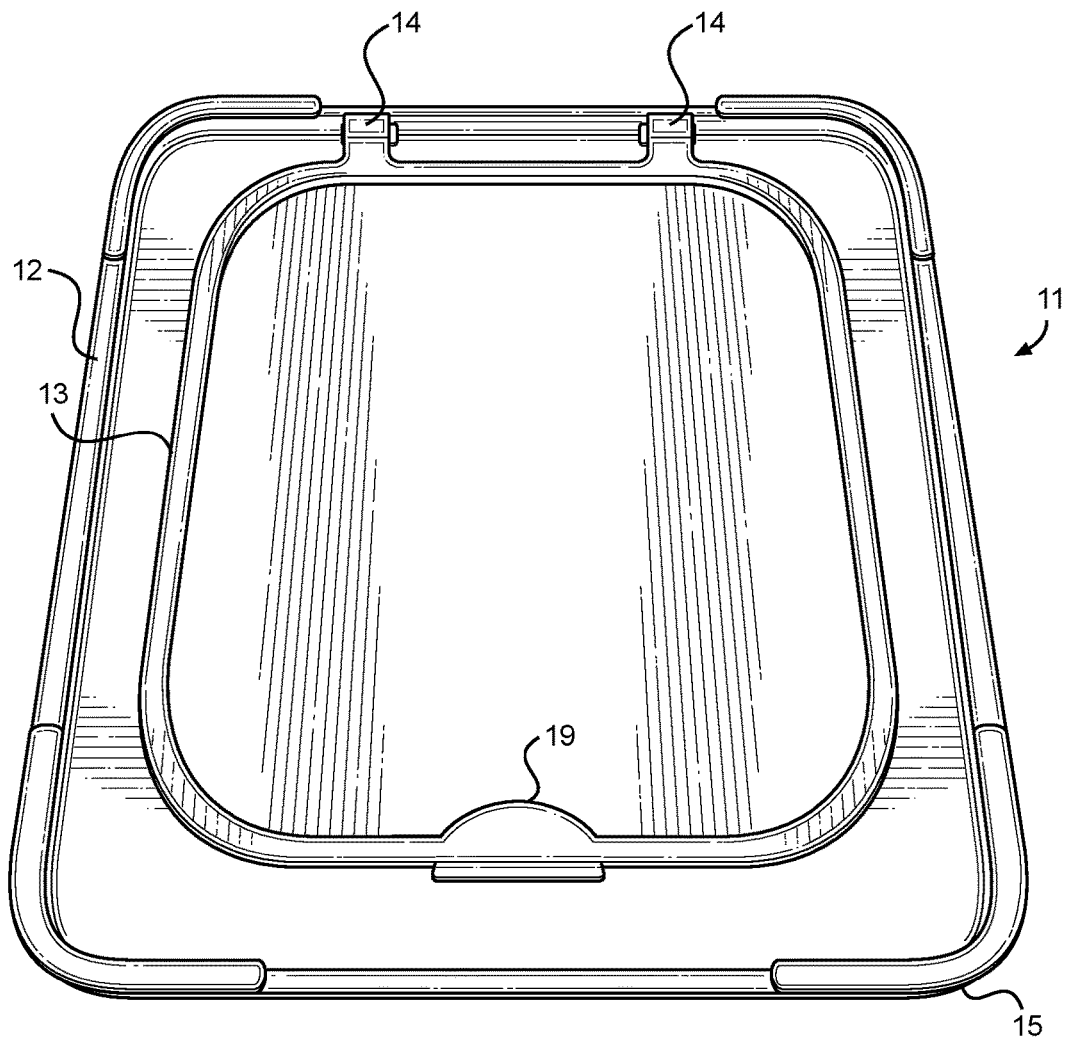
FIG. 2 shows an overhead view of a prior art food container cover.

Referring now to FIG. 2, there is shown an overhead view of a prior art food container cover 11. Conventional food container covers 11 that are known and used in the art comprise a cover plate 12, a lid 13, hinges 14, and a tab 19. Additionally, the upper flange 15 on the cover plate 12 in prior art covers only encompass the corners, and do not encompass the entire perimeter of the cover plate 12, as illustrated by the present invention in FIG. 1. The additional coverage afforded by the upper C-shaped flange 15 of the present invention ensures that the indicia contained thereon will not be inadvertently removed. The prior art cover 11 additionally includes a lid 13 that covers the entire cover plate 12 and does not provide a notch for accessing the contents of the container. Further, the prior art cover 11 comprises hinges 14 that enable the cover plate 12 to remain in an open position without an external force holding the device open.

Figure 3:
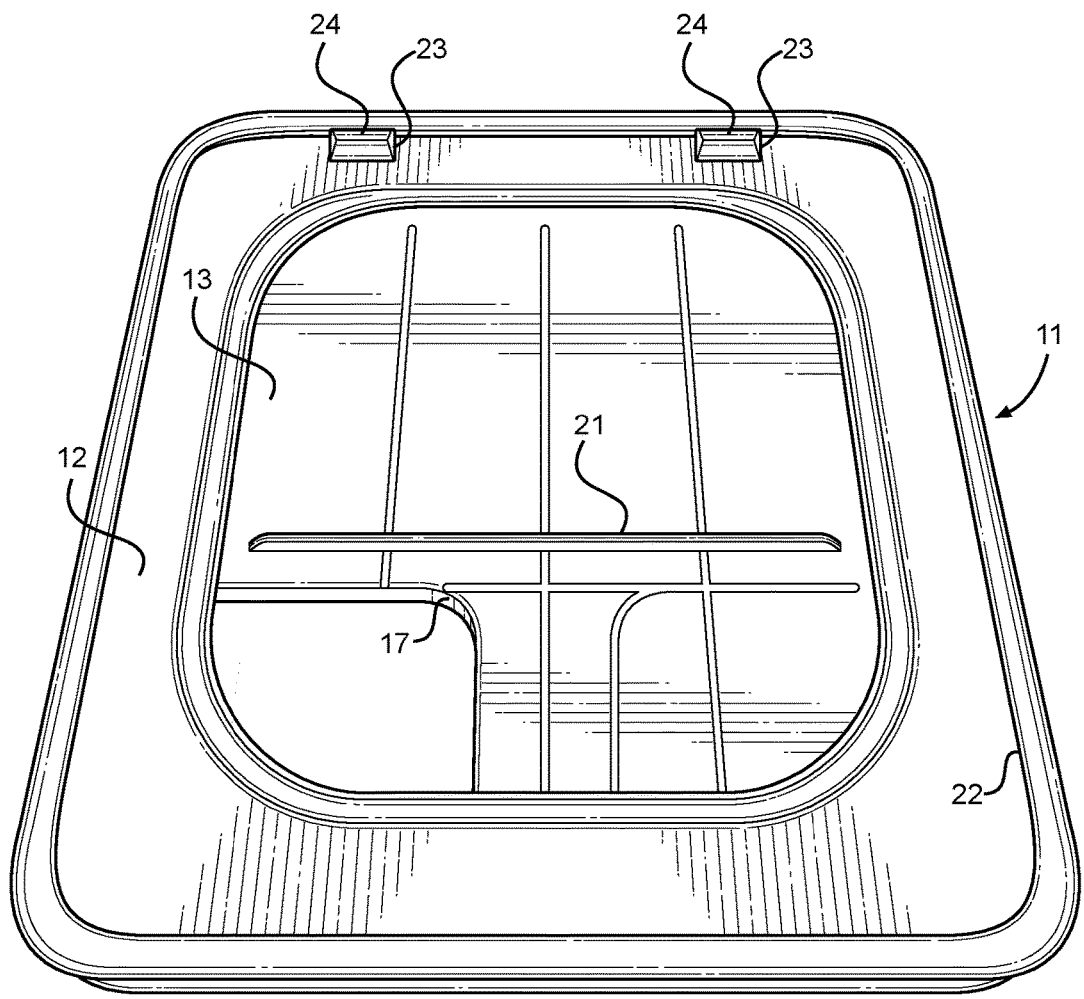
FIG. 3 shows a bottom view of the food container cover.

Referring now to FIG. 3, there is shown a bottom view of the food container cover 11. The lower side of the hinged lid 13 comprises one or more support ribs 21. The rib 21 provides enhanced rigidity to the hinged lid 13 when resting on the cover plate 12 and when held in an open position. As can be appreciated, the notch 17 reduces the amount of surface contact between the cover plate 12 and the hinged lid 13 when the cover 11 is retained in a closed position. The reduced contact produces the undesirable side effect of the hinged lid 13 sagging down towards the cover plate 12. The addition of the rib 21, however, provides additional rigidity to the hinged lid 13 to prevent sagging.

The lower side of the cover plate 12 further includes a lower flange 22 that extends therebelow. The lower flange 22 has a C-shaped cross-section for securing the cover 11 to a food container (not shown), which will be discussed in more detail below. Also visible from the lower side are a pair of apertures 23 for accepting a pair of hinge stops 24 from the hinged lid 13.

Figure 4:
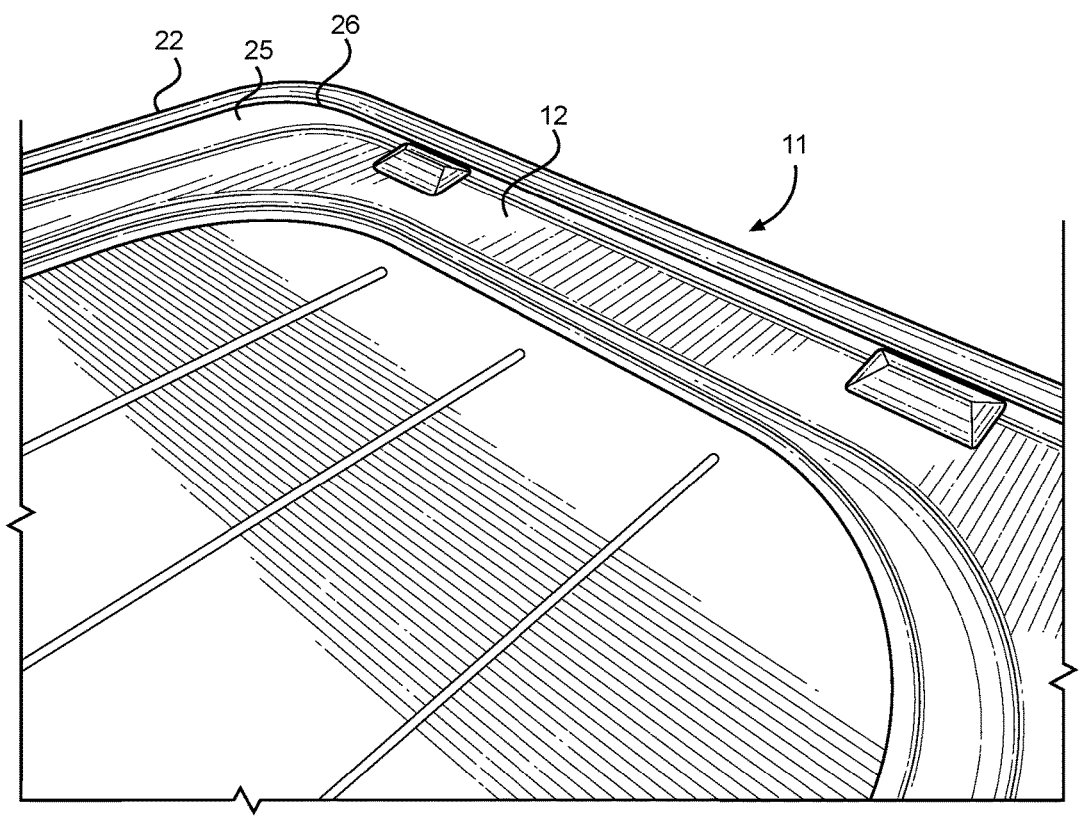
FIG. 4 shows a perspective bottom view of the food container cover.

Referring now to FIG. 4, there is shown a perspective bottom view of the food container cover 11. As shown in greater detail, the lower flange 22 comprises a C-shaped profile. The lower flange 22 extends below the cover plate 12, and includes a sidewall 25 with a lip 26. The length of the sidewall 25 enables the lower flange 22 to fit over top of a food container, such as a hotel pan (not shown). The lip 26 extends around the top of the container to provide a secure connection therebetween. An additional benefit of the lower flange 22 is that it prevents direct contact between adjacent pans when placed together. As can be appreciated, hotel pans are often constructed from metal, and when these pans make contact with one another they produce an undesirable clanging sound. The sidewall 25 wraps around and over the top of the container/pan, thereby muting the sound generated by metal-on-metal contact. In addition, the sidewall 25 is constructed of a dimensionally thin material so as to minimize the amount of space added to the container when the cover 11 is installed thereon.

Figure 5:
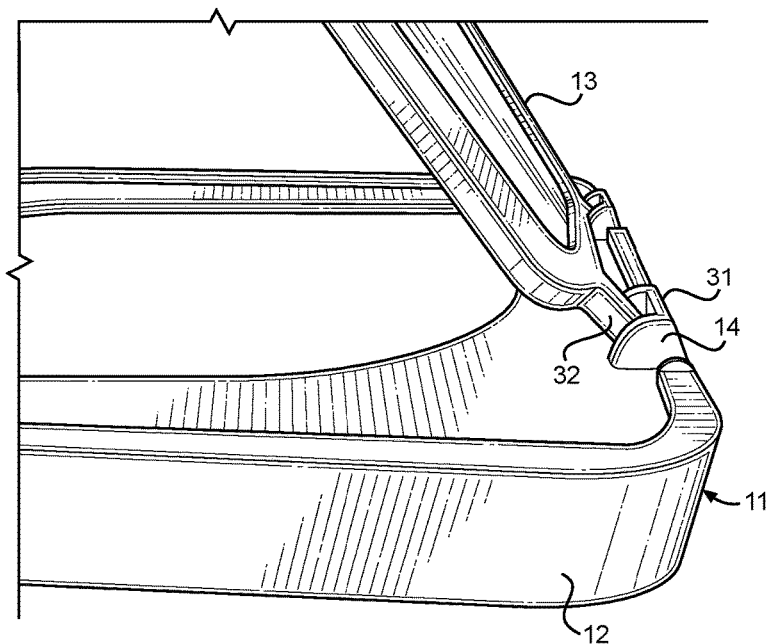
FIG. 5 shows a perspective side view of the self-closing hinges.
Figure 6:
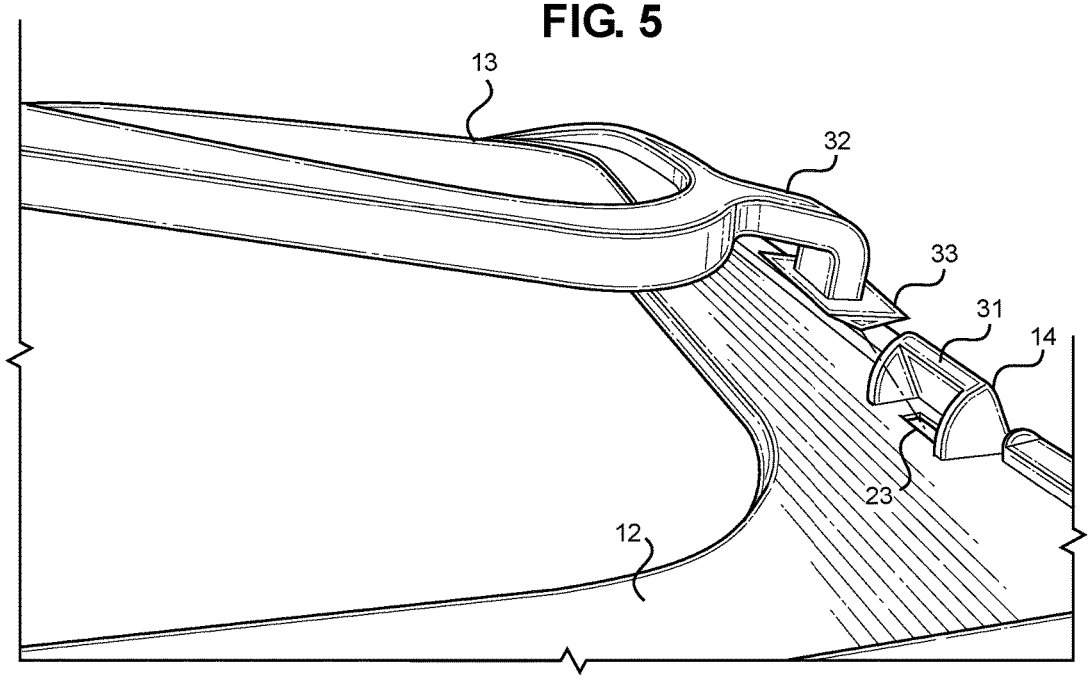
FIG. 6 shows a perspective view of the self-closing hinges.

Referring now to FIG. 5, there is shown a perspective side view of the self-closing hinges 14. The self-closing hinges 14 provide a means of attaching the cover plate 12 and hinged lid 13. The cover plate 12 includes a pair of hinge stops 31 extending above the surface thereof. The hinge stops 31 comprise a three-sided structure that shrouds the tabs 32 extending from the plate cover 12. The backwall of the hinge stops 31 is angled towards the front of the cover 11, and is designed to prevent the cover plate 12 from opening beyond 90 degrees. The tabs 32 are secured to the cover plate 12 via a pair of apertures (not shown) which will be illustrated and described in greater detail below Referring now to FIG. 6, there is shown a perspective view of the self-closing hinges 14. The cover plate 12 and hinged lid 13 are secured together via the self-closing hinges 14. The tabs 32 extending from the hinged lid 13 preferably include a J-shaped configuration with T-shaped heads 33 extending from the distal end. The T-shaped heads 33 are designed to fit through the apertures 23 in the cover plate 12. As can be appreciated, the T-shaped heads 33 are designed to be larger than the apertures 23 to prevent the heads 33 from being inadvertently removed. The heads 33 are forced through the apertures 23, and due to the flexible nature of the material used in the cover 11, the apertures 23 stretch to accommodate the heads 33 and secure them in position. The J-shaped configuration of the tabs 32 enable the hinged lid 13 to lay flat on top of the cover plate 12 when in a closed position. The upper surface of the heads 33 rests against the lower surface of the cover plate 12, and the angle of the tabs 32 allow the hinged lid 13 to rest flat against the cover plate 12. The hinge stops 31 make contact with the tabs 32 when the hinged lid 13 is opened, and cause the hinged lid 13 to close when the external force opening the lid 13 is removed.

Figure 7:
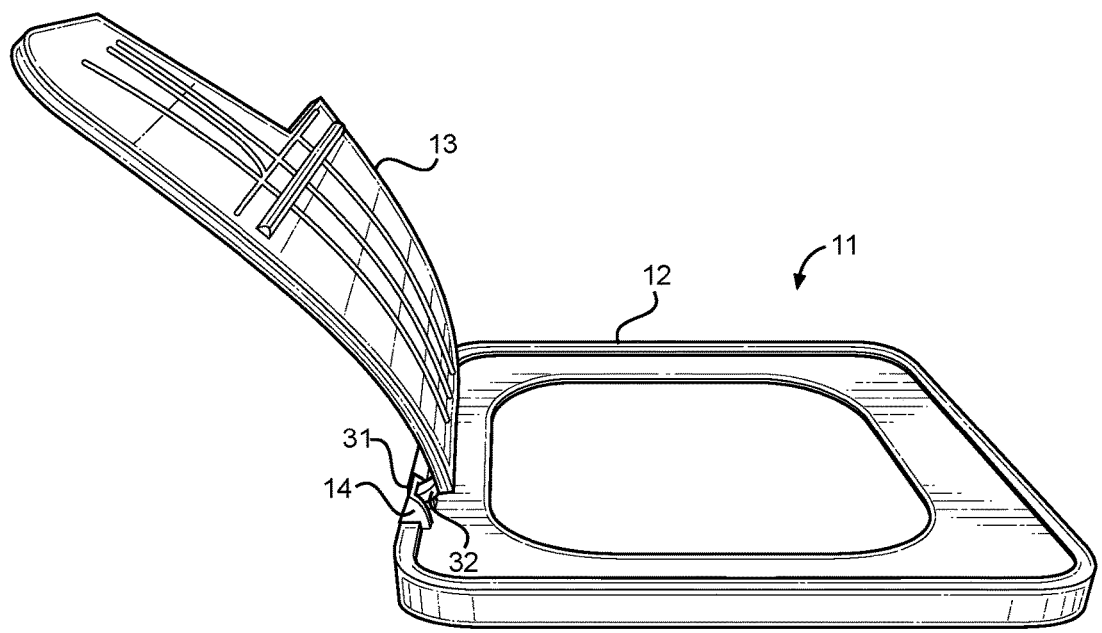
FIG. 7 shows a perspective view of the food container cover in an open position.

Referring now to FIG. 7, there is shown a perspective view of the food container cover 11 in an open position. The self-closing hinges 14 and the J-shaped tabs 32 cause the hinged lid 13 to remain closed when no external force is present. When the hinged lid 13 is opened, the J-shaped tabs 32 are bent towards the hinge stops 31 and make contact therewith. The combination of the flexing of the tabs 32 and the contact with the hinge stops 31 prevents the hinged lid 13 from remaining at an angle past 90 degrees without an external force. Therefore, when the force is removed, the hinged lid 13 returns to a closed position on top of the cover plate 12. This design is particularly advantageous over the covers that are currently known and available in the art. As can be appreciated, opening and closing lids can be burdensome to food service workers who are expected to work quickly while preparing food. The rapid pace of work may cause them to forget to close the lid, or may cause them to intentionally keep the lid open to enable quicker access to the contents therein. By utilizing a self-closing pair of hinges, the present invention minimizes the opportunity for lids to remain open and therefore decreases the chances for contamination of the food contained therein.

Referring now to FIG. 8, there is shown a front view of the food container cover 11 in an open position. The hinged lid 13 attaches to the cover plate 12 via a set of self-closing hinges 14. This configuration enables the hinged lid 13 to open and close in order to provide access to the contents of the container (not shown) via an aperture 41 in the cover plate 12. Also shown is the support rib 21 formed on the lower side of the hinged lid 13. The rib 21 provides enhanced rigidity to the hinged lid 13 when resting on the cover plate 12 and when held in an open position. When the distal end 43 of the hinged lid 13 rests upon the distal end 42 of the cover plate 12, a section of the hinged lid 13 remains unsupported due to the notch 17. As can be appreciated by one of skill in the art, the lack of support provided by the distal end 43 of the hinged lid 13 would ordinarily cause the lid 13 to deform and sag towards the aperture 41. The support rib 21, however, increases the structural rigidity of the lid 13 and thereby prevents deformation and sagging. The rib 21 spans the width of the hinged lid 13 and is designed to fit within the aperture 41 to ensure that the rib 21 does not prevent the hinged lid 13 from resting flat against the cover plate 12 when in a closed position.

Referring now to FIG. 9, there is shown an exploded view of the cover plate 12, hinged lid 13, and the first and second indicia inserts 52, 53. One of the key features of the present invention is the ability of the device to display advertisements or other indicia thereon. This is accomplished with the use of a first indicia insert 52 that attaches to the cover plate 12, and a second indicia insert 53 that attaches to the hinged lid 13. The first indicia insert 52 is secured via the upper C-shaped flange 15. The upper flange 15 has a C-shaped cross-section that rises above a surface of the cover plate 12. The upper flange 15 is designed to accept the edge 54 of the first indicia insert 52, thereby securing the first insert 52 to the surface of the cover plate 12. Similarly, the second indicia insert 53 secures to the hinged lid 13 via a second upper C-shaped flange 55 that extends above the plate 12 surface.

The first and second indicia inserts 52, 53 are shaped to match the contours of the cover plate 12 and the hinged lid 13. As shown, the first indicia insert 52 comprises cutouts 56 for the self-closing hinges 14, and an aperture 57 that matches the aperture 41 in the cover plate 12. Similarly, the second indicia insert 53 includes a notch 58 that matches the notch 17 in the hinged lid 13. The inserts 52, 53 can be constructed from any desired material. In the preferred embodiment, the inserts 52, 53 are constructed from a food grade plastic and include food safe inks and dyes to form the advertisements thereon. As a non-limiting example, each insert can include its own indicia. The secondary insert 53 may contain a food brand, trademark, or other means for indicating the source of goods contained within the food container, while the first insert 52 may contain an advertising slogan, description of the contents, and the like.

Referring now to FIG. 10, there is shown an overhead view of the food container cover 11 with first and second indicia inserts 52, 53 installed. The first and second indicia inserts 52, 53 secure directly to the cover plate 12 and hinged lid 13, respectively to provide a means for utilizing the food container cover 11 as an advertising tool. The edge 54 of the first indicia insert 52 slides under the upper C-shaped flange 15 and rests on the surface of the cover plate 12. The edge 59 of the second indicia insert 53 slides under the second upper C-shaped flange 55 and rests on the surface of the hinged lid 13. As described above, the first indicia insert 52 further includes cutouts 56 that prevent the insert 52 from interfering with the self-closing hinges 14. Also shown is the notch 58 in the second indicia insert 53 that matches the contours of the notch 17 in the hinged lid 13.

The first and second indicia inserts 52, 53 are independent of the cover plate 12 and hinged lid 13, and can therefore be replaced and removed as desired. The independent nature of the components provides for updating of advertising logos, trademarks, slogans, and descriptions of the contents of the container without requiring replacement of the entire lid. As an example, a company can utilize advertising indicia to promote a particular food type during the year, such as barbeque food during the summer, and can remove and replace the indicia with different advertisements for fall and/or winter. It can be appreciated that the ability to switch components without the need to replace the entire lid affords substantial cost saving benefits over one-piece lids that are currently known and used in the art.

Referring now to FIG. 11, there is shown a side view of the food container cover 11 installed on a food container 61. The food container cover 11 of the present invention is designed to secure to the top of food containers that are known and used in the art. As a non-limiting example, the cover 11 of the present invention can be secured to the top of hotel pans of varying size, from full pans that measure 12 inches×20 inches all the way down to ⅑ pans that measure 4 inches×6⅔ inches. The cover 11 secures to the food container 61 via the lower flange 22. The lower side of the cover plate 12 comprises a lower flange 22 that extends therebelow and secures around the upper lip (not shown) of the food container 61. The lower flange 22 has a C-shaped cross-section that wraps around the upper, lower, and side lip surface (not shown) of the container 61. Having the cover 11 secured to the container 61 enables one to quickly open and close the hinged lid 13 without the entire cover 11 being inadvertently removed therefrom.

Referring now to FIG. 12, there is shown a perspective view of the food container cover 11 installed on a food container 61 with the hinged lid 13 in an open position. When the second indicia insert 53 is installed on the hinged lid 13, it provides increased rigidity thereto. As shown in FIG. 7, the hinged lid 13 is constructed of a flexible material, wherein the lid 13 flexes as it is opened. When the second indicia insert 53 is installed, it prevents flexing. The lack of flex in the hinged lid 13 also assists with the self-closing nature of the device. By preventing flex in the hinged lid 13, the lid 13 more readily returns to a closed position when the external force holding it open is removed. Also shown is the aperture 41 in the cover plate 12, which provides access to the contents of the container 61. As shown, the aperture 41 matches the opening in the container 61 to provide unobstructed access thereto. As can be appreciated, when the hinged lid 13 is closed, it functions as a lid or cover to protect the contents of the container 61 from exposure to airborne contaminants.

Referring now to FIG. 13, there is shown a view of a plurality of food container covers in different sizes. As discussed above, the covers 11 of the present invention can be constructed in any desired shape and/or size in order to fit food containers of varying configuration. A non-limiting example of the food containers intended for use with the cover 11 of the present invention are hotel pans or steam table pans. As can be appreciated, hotel pans come in a variety of sizes and configurations. Common sizes for larger hotel pans include full pans, half pans, and ⅔ pans. Smaller hotel pans are typically sized as ⅓ pans, ¼ pans, ⅙ pans, and ⅑ pans. FIG. 13 shows the cover of the present invention configured for use with a ⅙ pan, a ⅑ pan, and a ⅓ pan. These examples should be considered non-limiting and for illustrative purposes only. The cover 11 can also be configured for use with glass container, plastic reusable containers, and disposable food containers. Instead of having a C-shaped flange, the cover can be configured to snap onto a glass or plastic container. Regardless of size, each cover 11 includes a primary and hinged lid, and a first and second indicia insert. Additionally, the cover 11 can be constructed from a variety of materials, such as high-density polyethylene, low density polyethylene, polyethylene terephthalate, and polypropylene, and the like. In a preferred embodiment, the cover 11 can be constructed from an FDA approved silicone, which allows for use in ovens and other heating applications. As can be appreciated, a cover can be constructed from a transparent, semi-transparent, or translucent material for ease of identifying the contents therein.

Overall, the present invention provides a convenient solution for covering various types of food containers. The cover protects the contents of the food container from contamination, allows access for spoons, ladles, and the like, and provides a means for using advertising indicia. The covers can be quickly installed and removed, and the advertising indicia can be updated without requiring an entirely new cover. Additionally, the self-closing nature of the cover ensures that the contents of the food container will remain covered, even if food service workers forget to close the lid after serving.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cover for a food container, said cover having an open position and a closed position, said cover comprising:
    a cover plate comprising an upper and a lower surface; a C-shaped flange that rises above said cover plate upper surface; an aperture to provide unobstructed access to said food container when said cover is positioned on said food container; and a pair of hinge apertures;
    a hinged lid comprising an upper and a lower surface; a C-shaped flange that rises above said hinged lid upper surface; a notch; one or more support ribs positioned on said lower surface of said hinged lid and spanning the width of said hinged lid; wherein said rib provides enhanced rigidity to said hinged lid and prevents sagging caused by said notch;
    a pair of self-closing hinges comprising tabs extending from said hinged lid; wherein said tabs further comprise a J-shaped configuration with T-shaped heads extending from said tabs, said T-shaped heads passing through said hinge apertures in said cover plate;
    a pair of hinge stops comprising a three-sided structure that shrouds said tabs, said hinge stops being angled towards said hinges and preventing said hinged lid from remaining in an open position without an external force holding said hinged lid open a first indicia insert comprising a pair of cutouts to accept said self-closing hinges and said hinge stops when said insert rests on said upper surface of said cover plate; an aperture to provide unobstructed access to said food container when said cover is positioned on said food container; wherein said first indicia insert is secured to said upper surface of said cover plate by placing said cover plate upper C-shaped flange over the edge of said first indicia insert; and a second indicia insert comprising a notch that matches said notch on said hinged lid to enable said second indicia insert to rest on said hinged lid; wherein said second indicia insert is secured to said upper surface of said hinged lid by placing said hinged lid upper C-shaped flange over the edge of said second indicia insert.

2. The cover of claim 1, wherein said cover plate comprises a second flange having a C-shaped cross-section extending below and substantially around a periphery of said food container and securing said cover to said food container.

3. The cover of claim 1, wherein said hinge stops three-sided structure comprises a backwall and a pair of sidewalls extending above the surface of said plate cover.

4. The cover of claim 3, wherein said backwall of said hinge stops is angled towards the front of said cover, said backwall preventing said hinged lid from opening to an angle greater than 90 degrees.

5. The cover of claim 1, wherein said cover secures to a hotel pan selected from the group consisting of a full pan, a half pan, a ⅔ pan, a ⅓ pan, a ¼ pan, a ⅙ pan, and a ⅑ pan.

6. The cover of claim 1, wherein said first and second indicia insert are constructed from a food grade plastic and include food safe inks and dyes to form the advertisements thereon.

* * * * *